(12) United States Patent
Liu et al.

(10) Patent No.: US 6,741,452 B1
(45) Date of Patent: May 25, 2004

(54) RETAINING DEVICE FOR SWITCH

(75) Inventors: Alvin Liu, Tu-chen (TW); Yuan-Lin Hsu, Tu-Chen (TW); Li Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/339,864

(22) Filed: Jan. 10, 2003

(30) Foreign Application Priority Data

Dec. 13, 2002 (CN) ........................................ 91220205 U

(51) Int. Cl.[7] ................................................. H02B 1/04
(52) U.S. Cl. ...................... 361/631; 361/643; 361/809; 248/27.3; 24/296; 200/295
(58) Field of Search ................................ 261/600, 627, 261/631, 643, 644, 647, 652, 651; 24/293, 294, 296; 200/293, 294, 295, 296; 248/27.1, 27.3

(56) References Cited

U.S. PATENT DOCUMENTS

| | | | | |
|---|---|---|---|---|
| 3,866,868 A | * | 2/1975 | Fish et al. ................. | 248/27.3 |
| 4,340,795 A | * | 7/1982 | Arthur ........................ | 200/295 |
| 4,406,936 A | * | 9/1983 | Ohashi ........................ | 200/296 |
| 4,429,200 A | * | 1/1984 | Glenn et al. .............. | 200/332.1 |
| 4,535,534 A | * | 8/1985 | Ohashi et al. ................. | 29/832 |
| 4,705,241 A | * | 11/1987 | Sadao et al. ................ | 248/27.3 |
| 5,604,661 A | * | 2/1997 | Nagao ........................ | 361/643 |
| 6,080,946 A | * | 6/2000 | Lee et al. ................... | 200/293 |
| 6,423,916 B1 | * | 7/2002 | Koebrick ..................... | 200/293 |

* cited by examiner

*Primary Examiner*—Boris Chervinsky
(74) *Attorney, Agent, or Firm*—Wei Te Chung

(57) ABSTRACT

A retaining device (20) for mounting a switch (10) to a computer enclosure (30) includes a main wall (22) and left and right side walls (24) cooperatively defining a space therebetween for accommodating the switch therein. A pair of pins (28) is stamped perpendicularly from the main wall. An extension tab (23) extends from the left side wall and defines a through aperture (25) therein. A bent tab (27) extends from the right side wall. In assembly, the switch is received in the retaining device with the pins being received in through holes of the switch. The combined retaining device and switch is then attached to a panel (32) of the enclosure (30). The bent tab is engagingly received in a locking aperture of the panel. A screw (40) is extended through the through aperture (25) to engage with the panel in a screw aperture (38) thereof.

16 Claims, 6 Drawing Sheets

RETAINING DEVICE FOR SWITCH

BACKGROUND OF THE INVENTION

1. Field of the Invention

The present invention relates to a retaining device for electronic components, and more particularly to a retaining device for mounting a switch to an enclosure.

2. Description of the Related Art

When using a computer, a user may need to know the state of an enclosure of the computer for safety and maintenance reasons. A switch installed in the enclosure can detect whether a cover of the enclosure is in a closed position. Taiwan Patent No. 215298 discloses a retaining device for a switch. The retaining device comprises a rectangular bottom wall, with a plurality of holes being defined in the bottom wall. An elastic obtuse sidewall extends upwardly from one end of the bottom wall, and an L-shaped sidewall extends from another end of the bottom wall. In assembly, the obtuse sidewall is pushed outwardly, and a switch is received between the obtuse and L-shaped sidewalls. The obtuse sidewall is then released, whereupon it rebounds and clamps the switch between the obtuse and L-shaped sidewalls. A plurality of screws is extended into the holes of the bottom wall for fastening the combined switch and retaining device to another piece of equipment such as a computer enclosure. However, the retaining device only restricts movement of the switch along a first axis that is perpendicular to the obtuse and L-shaped sidewalls. The retaining device does not restrict movement of the switch along a second axis that is parallel to the obtuse and L-shaped sidewalls. In addition, attachment of the retaining device using screws is unduly laborious and time consuming. Furthermore, a tool is usually required for installation and removal of the screws.

SUMMARY OF THE INVENTION

Accordingly, an object of the present invention is to provide a retaining device which enables a switch to be easily and securely attached to a computer enclosure.

To achieve the above object, a retaining device for a switch in accordance with the present invention comprises a main wall and left and right side walls extending outwardly from opposite sides of the main wall. The main wall and the left and right side walls cooperatively define a space therebetween for accommodating the switch therein. A pair of pins is stamped perpendicularly from the main wall. An extension tab extends from the left side wall and defines a through aperture therein. A bent tab extends from the right side wall. In assembly, the switch is received in the retaining device with the pins being received in through holes of the switch. The combined retaining device and switch is then attached to a panel of the enclosure. The bent tab is inserted into a locking aperture of the panel. A screw is extended through the through aperture to engage with the panel at a screw aperture thereof.

Other objects, advantages and novel features of the present invention will be drawn from the following detailed description of a preferred embodiment of the present invention with the attached drawings, in which:

DESCRIPTION OF THE PREFERRED EMBODIMENTS

Figure 1:
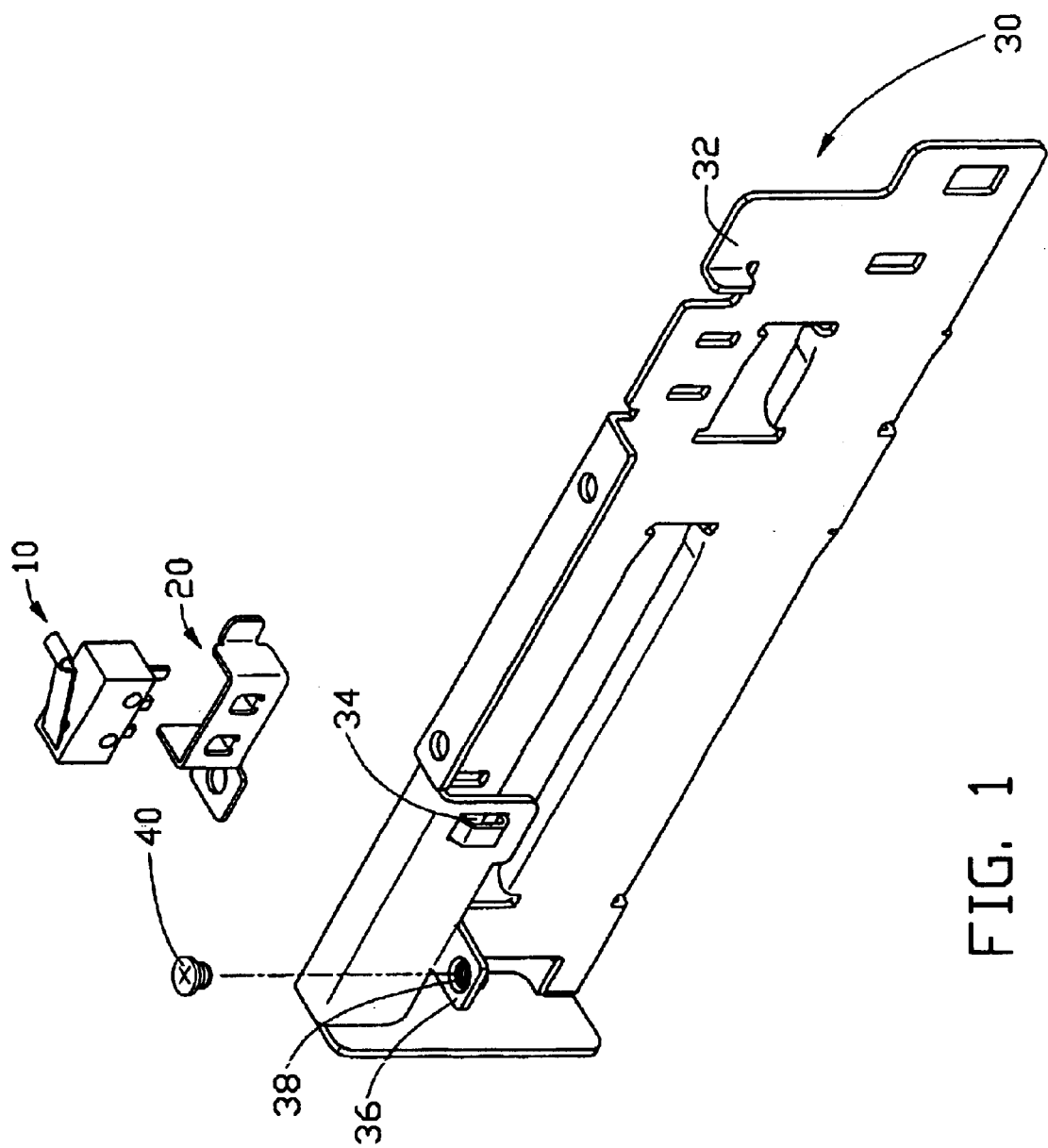
FIG. 1 is an isometric view of a retaining device in accordance with a preferred embodiment of the present invention, together with a switch, and a side panel of a computer enclosure.

Referring to FIG. 1, a retaining device 20 in accordance with a preferred embodiment of the present invention is provided for attaching a switch 10 to a part of a computer enclosure 30. The enclosure 30 comprises a side panel 32. A vertical locking aperture 34 is defined in the side panel 32. A horizontal support tab 36 is inwardly formed from the side panel 32. A screw aperture 38 is defined in the support tab 36. A screw 40 is provided for securing the retaining device 20 to the side panel 32.

Figure 2:
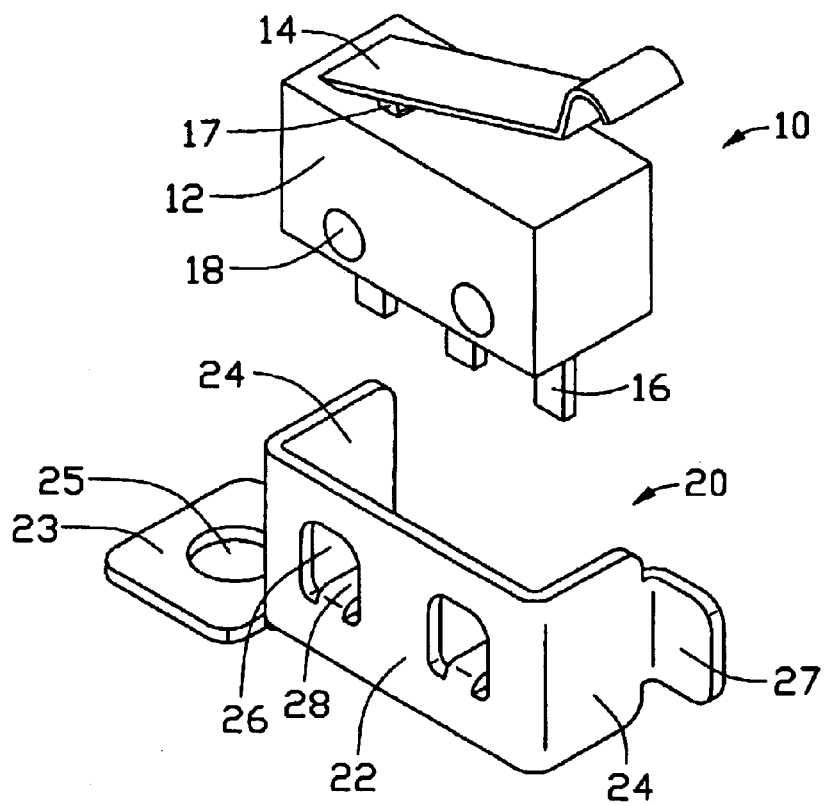
FIG. 2 is an enlarged view of the retaining device and the switch of FIG. 1.

Referring also to FIG. 2, the switch 10 comprises a parallelepiped body 12. An elastic plate 14 extends obliquely upwardly from near an end of a top surface of the body 12. Three aligned terminals 16 depend from a bottom surface of the body 12. A pair of spaced, parallel through holes 18 is defined through the body 12 between opposite side surfaces thereof, near the bottom surface thereof. A contact 17 is disposed on the top surface of the body 11 under the elastic plate 14. When the elastic plate 14 touches the contact 17, the contact 17 can produce a signal that is output from the terminals 16.

The retaining device 20 comprises a main wall 22, and a pair of left and right side walls 24 extending outwardly from opposite ends of the main wall 22 respectively. A pair of locking pins 28 is stamped outwardly from the main wall 22, corresponding to the through holes 18 of the switch 10. A pair of through openings 26 is thus defined in the main wall 22. A horizontal extension tab 23 extends perpendicularly leftward from a bottom edge of the left side wall 24. A through aperture 25 is defined in the extension tab 23, corresponding to the screw aperture 38 of the side panel 32. A vertical bent tab 27 is bent perpendicularly rightward from a distal edge of the right wall 24, for inserting into the locking aperture 34 of the side panel 32.

Figure 3:
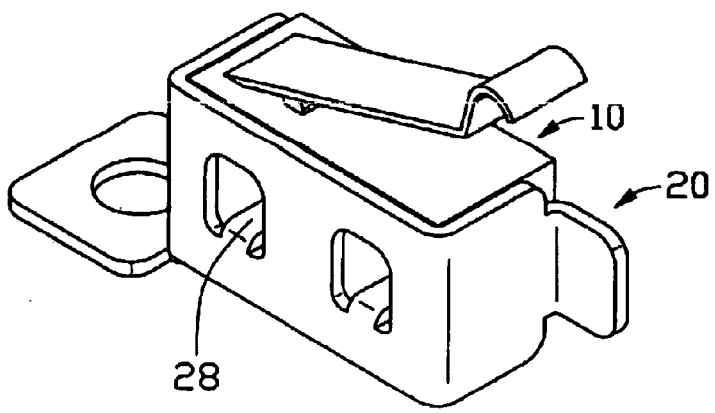
FIG. 3 is an assembled view of FIG. 2.
Figure 4:
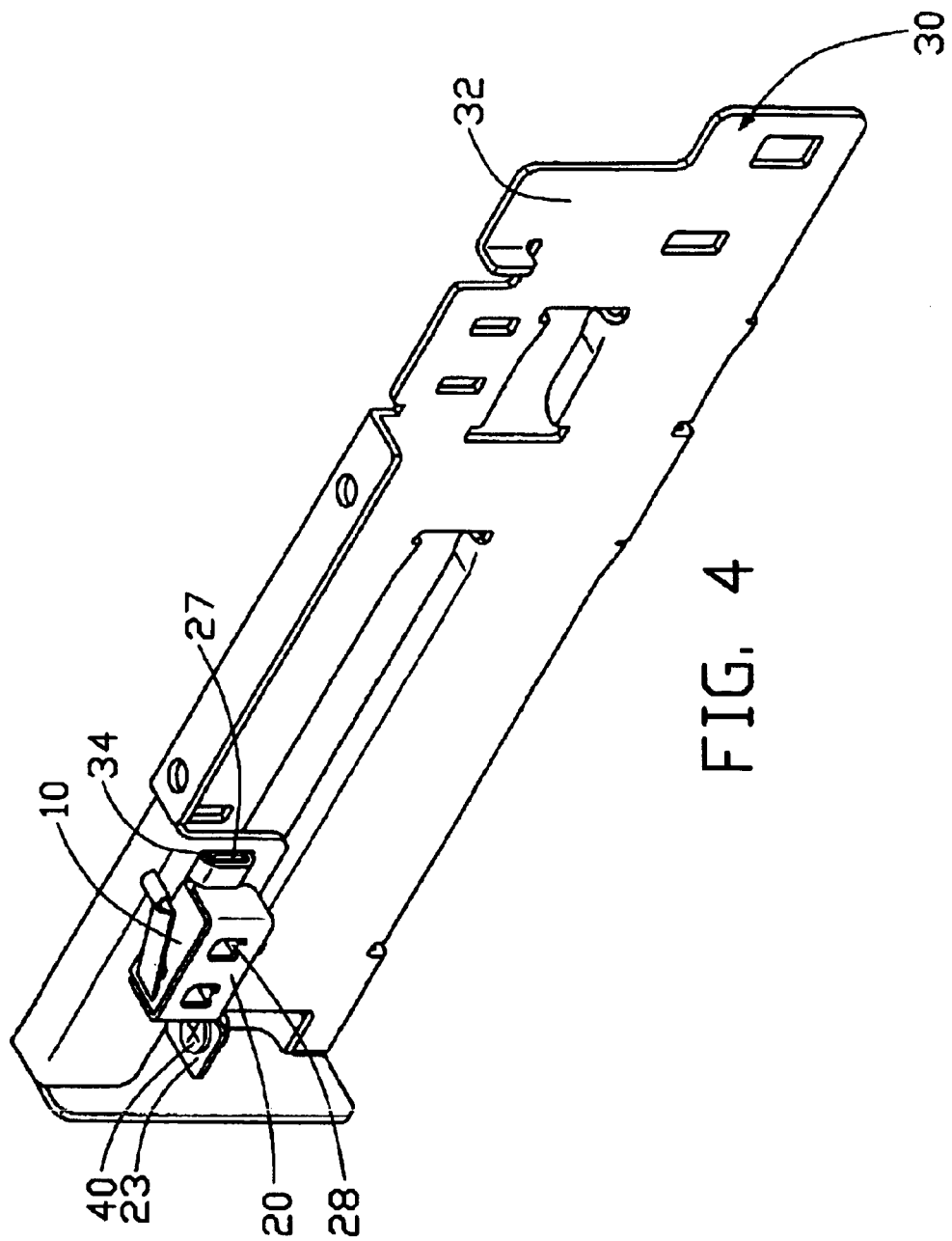
FIG. 4 is an assembled view of FIG. 1.

Referring to FIGS. 3 and 4, in assembly, the switch 10 is received in the retaining device 20. The pins 28 of the retaining device 20 are received in the through holes 18 of the switch 10. The combined retaining device 20 and switch 10 is then attached to the side panel 32 of the enclosure 30. The extension tab 23 of the retaining device 20 is supported on the support tab 36 of the side panel 32. The through aperture 25 is aligned with the screw aperture 38. The bent tab 27 of the retaining device 20 is engagingly received in the locking aperture 34 of the side panel 32. The bent tab 27 is thus parallel to the side panel 32. The screw 40 is extended through the through aperture 25 to engage in the screw aperture 38. Thus, the combined retaining device 20 and switch 10 is securely attached to the side panel 32.

In this position, movement of the switch 10 in any direction parallel to the side panel 32 is restricted by the left and right side walls 24 and the pins 28 of the retaining device 20. Movement of the switch 10 in directions perpendicular to the side panel 32 is restricted by the main wall 22 of the retaining device 20 and the side panel 32. The elastic plate 14 protrudes upwardly beyond a top extremity of the side panel 32. Thus when a top panel (not shown) of the enclosure 30 is closed, the top panel pushes the elastic plate 14 downwardly to touch the contact 17 of the switch 10, and a "closed" signal is output through the terminals 16 of the switch 10.

Figure 5:
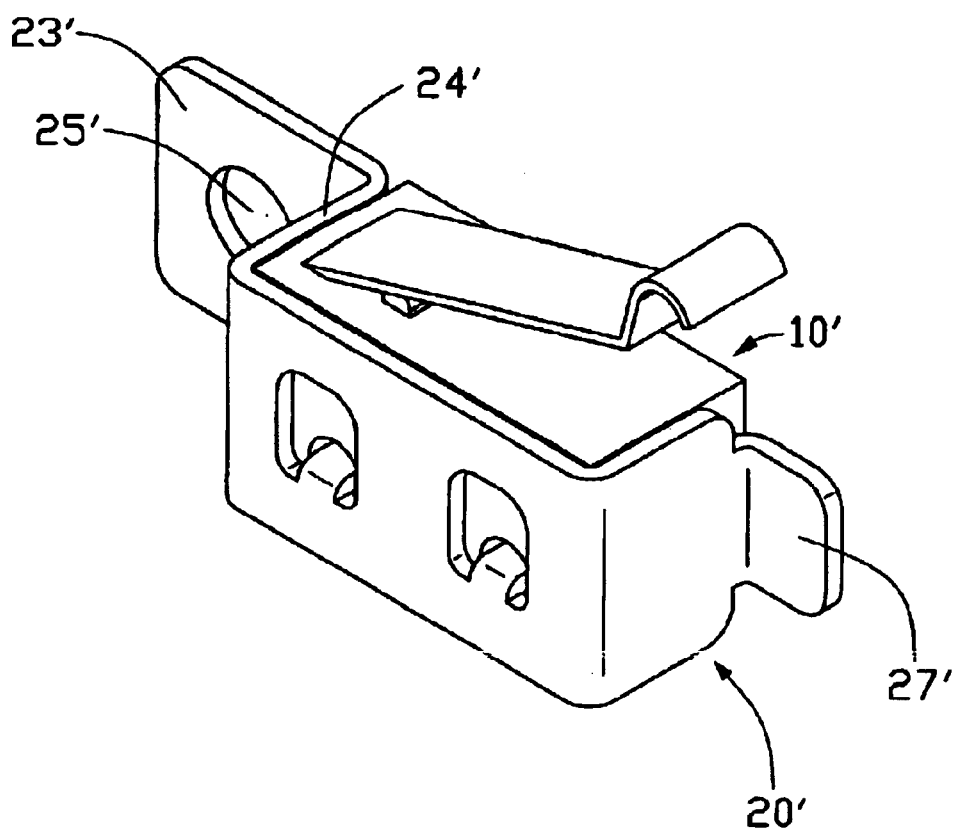
FIG. 5 is an enlarged, isometric view of a retaining device in accordance with an alternative embodiment of the present invention having a switch retained therein.
Figure 6:
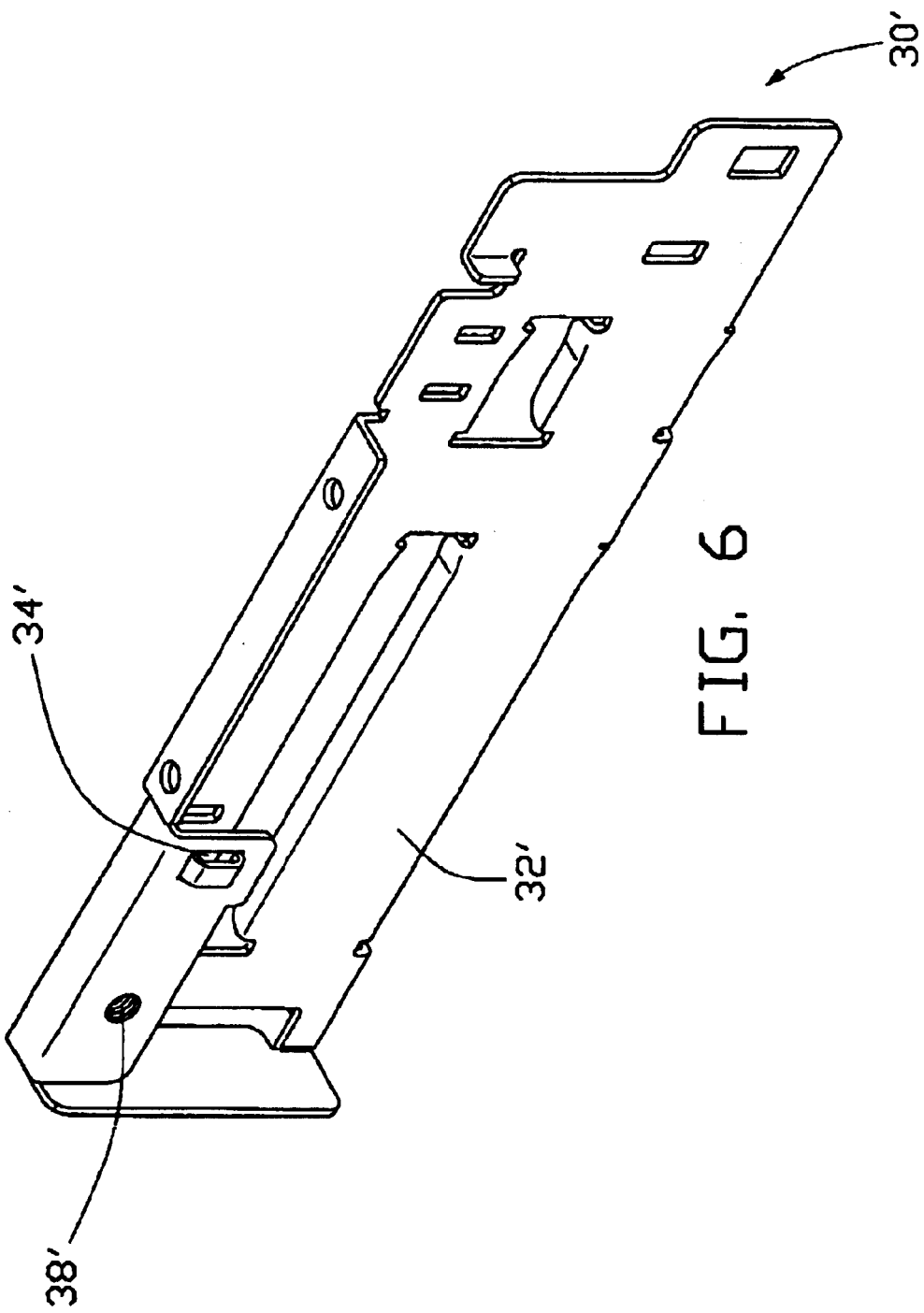
FIG. 6 is an isometric view of a side panel of a computer enclosure for use with the retaining device of FIG. 5.
Figure 7:
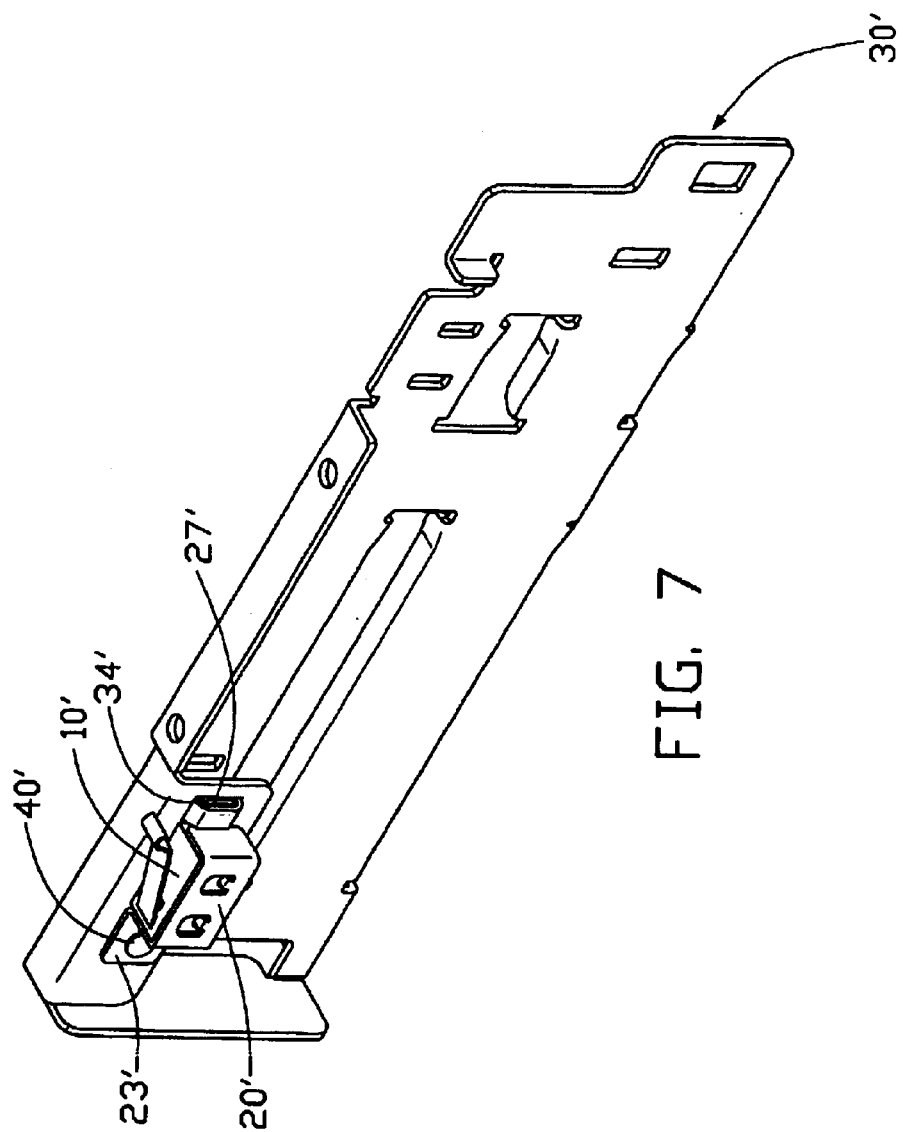
FIG. 7 is similar to FIG. 6, but showing the combined retaining device and switch of FIG. 5 attached to the side panel.

FIG. 5 shows a retaining device 20' in accordance with an alternative embodiment of the present invention with a switch 10' received therein. The switch 10' is the same as the switch 10 described above in relation to the preferred embodiment. The retaining device 20' is similar to the retaining device 20 of the preferred embodiment, except for the following. A vertical extension tab 23' extends leftward from a free end of a left side wall 24'. Referring also to FIGS. 6 and 7, a computer enclosure 30' is similar to the enclosure 30 described above in relation to the preferred embodiment. The enclosure 30' comprises a side panel 32'. A vertical locking aperture 34' is defined in the side panel 32', engagingly receiving a bent tab 27' of the retaining device 20'. A screw aperture 38' is defined in the side panel 32'. A screw 40' extends through a through aperture 25' of the retaining device 20' and engages in the screw aperture 38'.

While the present invention has been illustrated by the description of the preferred embodiments thereof, and while the preferred embodiment have been described in considerable detail, it is not intended to restrict or in any way limit the scope of the appended claims to such detail. Addition advantages and modifications within the spirit and scope of the present invention will readily appear to those skilled in the art. Therefore, the invention is not limited to the specific details and illustrative examples shown and described.

What is claimed is:

1. A retaining device for attaching a switch to a panel, the switch defining at least one hole, the retaining device comprising:
   a main wall;
   a first side wall and a second wall respectively extending outwardly from opposite ends of the main wall, the main wall and the side walls cooperatively defining a space therebetween for accommodating the switch therein; and
   at least one pin arranged in the space for engaging in the at least one hole of the switch;
   an extension tab extending from the first side wall and fixedly secured to the panel; and
   a bent tab extending from the second side wall and detachably secured to the panel.

2. The retaining device as claimed in claim 1, wherein the at least one pin is stamped from the main wall.

3. The retaining device as claimed in claim 1, wherein the extension tab defines a through aperture for extension of a fastener therethrough to engage with the panel.

4. The retaining device as claimed in claim 3, wherein the extension tab extends horizontally from a bottom end of the first side wall.

5. The retaining device as claimed in claim 3, wherein the extension tab extends vertically from a free end of the first side wall.

6. A retaining device assembly comprising:
   a panel;
   a switch; and
   a retaining device comprising:
      a space receiving the switch therein;
      a locking means protruding from the retaining device and fixedly attached to the panel; and
      a latch means from the retaining device and detachably attached to the panel,
      whereby the switch is securely sandwiched between the retaining device and the panel.

7. The retaining device assembly as claimed in claim 6, wherein the switch comprises a generally parallelepiped body, an elastic plate obliquely extends from a main face of the parallelepiped body, and a plurality of electrical terminals extends from an opposite main face of the parallelepiped body.

8. The retaining device assembly as claimed in claim 6, wherein the retaining device comprises a first wall, and a parallel second and third wall extending from opposite ends of the first wall, and wherein the space is cooperatively defined by the first, second, and the third wall.

9. The retaining device assembly as claimed in claim 8, wherein the panel defines a locking aperture, the latch means comprises a bent tab extending perpendicularly from the third plate and engaging in the locking aperture.

10. The retaining device assembly as claimed in claim 8, wherein the panel defines a fastening aperture, the locking means comprises an extension tab extending from the second wall, the extension tab defines a through aperture, and a fastener extends through the through aperture and engaging in the fastening aperture.

11. The retaining device assembly as claimed in claim 10, wherein the extension tab extends horizontally from a bottom end of the first wall, a support tab extends from the panel supporting the extension tab thereon, and the fastening aperture is defined in the supporting tab.

12. The retaining device assembly as claimed in claim 10, wherein the extension tab extends vertically from a free end of the second wall and is parallel to the panel.

13. A retaining device assembly comprising:
   a panel defining at least one retention section;
   a rectangular type switch;
   a retaining device including:
      at least one locking device fastened to the at least one retention section of the panel; and
      a pin extending from the retaining device in a first direction; wherein
         the switch is coupled to the retaining device along said first direction, and the retaining device cooperates with said panel to sandwich said switch therebetween along said first direction under a condition that the pin prevent said switch from moving in any directions perpendicular to said first direction.

14. The assembly as claimed in claim 13, wherein said retaining device includes a U-shaped configuration defining a corresponding space receiving said switch therein.

15. The assembly as claimed in claim 14, wherein said U-shaped configuration includes two side arms connected by a bight, wherein said at least one locking device is formed on a corresponding one of said side arms, and the pin is formed on the bight.

16. The assembly as claimed in claim 15, wherein there are two locking device respectively formed on the corresponding side arms.

* * * * *